Feb. 18, 1969             D. W. HALL II            3,428,885
VOLTAGE REGULATED POWER SUPPLY INCLUDING A BREAKDOWN
DEVICE AND MEANS TENDING TO KEEP THE CURRENT
FLOW THERETHROUGH CONSTANT
Filed Sept. 29, 1966
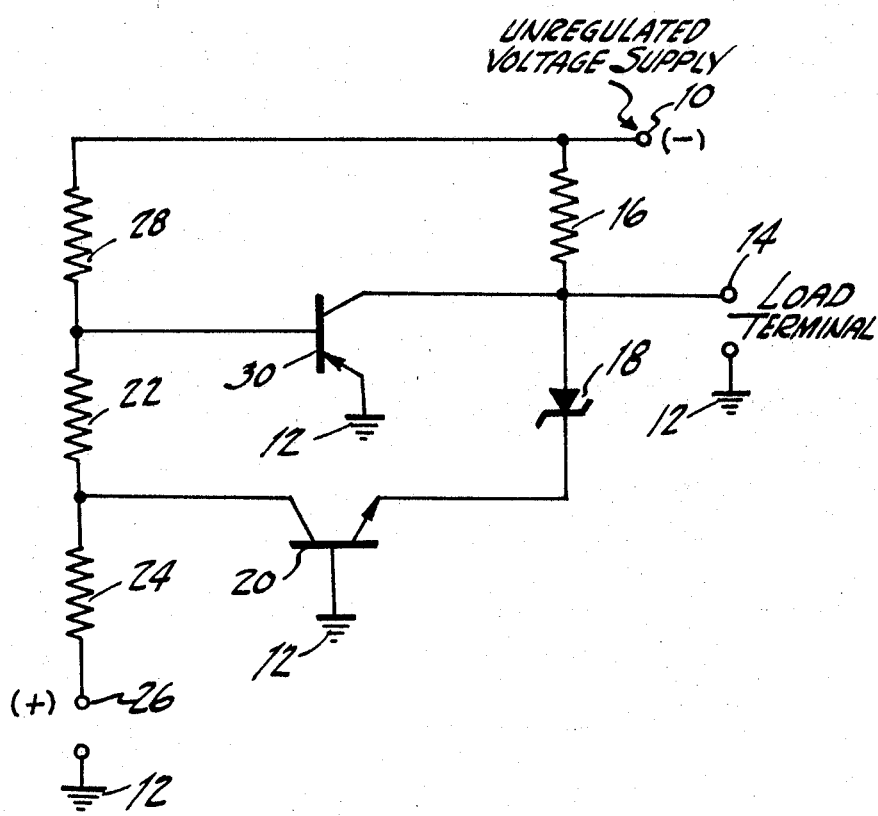
INVENTOR
DAVID W. HALL II
Simon Yaffee
ATTORNEY

United States Patent Office 3,428,885
Patented Feb. 18, 1969

3,428,885
VOLTAGE REGULATED POWER SUPPLY INCLUDING A BREAKDOWN DEVICE AND MEANS TENDING TO KEEP THE CURRENT FLOW THERETHROUGH CONSTANT
David Wilson Hall II, North Palm Beach, Fla., assignor to Radio Corporation of America, a corporation of Delaware
Filed Sept. 29, 1966, Ser. No. 582,849
U.S. Cl. 323—22     7 Claims
Int. Cl. G05f 1/40

ABSTRACT OF THE DISCLOSURE

A voltage regulated power supply is obtained by applying the voltage developed across a breakdown device after breakdown to a load. Since the voltage across the breakdown device varies as the current therethrough varies, the current through the breakdown device is sensed and in response thereto the current through a shunt circuit around the breakdown device is varied to keep the current through the breakdown device, and therefore the voltage thereacross, substantially constant.

---

This invention relates to a voltage regulated power supply.

While voltage regulated power supplies are known, the usual regulated power supply is a complicated, expensive piece of equipment requiring many components. A simple, inexpensive regulated power supply needing only a few components is desirable.

It is an object of this invention to provide an improved voltage regulated power supply.

It is another object of this invention to provide a regulated power supply having a minimum number of components.

It is still another object of this invention to provide a simple inexpensive regulated power supply.

Voltage from an unregulated source may be applied to a load through a resistor with a Zener diode or other breakdown device having similar properties being connected across the load. The voltage drop across a Zener diode at breakdown is nearly independent of current flow therethrough, and therefore the voltage applied to the load, which is connected across the Zener diode would be nearly constant for this connection. However, the voltage across the diode does vary with the current flow therethrough. Therefore, when the voltage of the source varies, the current through the Zener diode will vary. Also, when the current drawn by the load varies, the current flowing through the diode will also vary. Therefore, in the connection described, the voltage applied to the load will vary if the voltage supply varies or if the load varies. In accordance with this invention, means are provided to sense the current flowing through a Zener diode and means responsive to the sensing means are provided to keep the current flowing through the diode substantially constant, whereby the voltage drop across the diode, and therefore the voltage applied to the load, remains constant.

The invention will be better understood upon reading the following description in connection with the accompanying drawing in which the sole figure is a schematic circuit diagram of the voltage regulator of this invention.

Referring to the figure, an unregulated voltage power supply, not shown, is connected between the terminal 10 and ground 12, and a load (not shown) requiring a voltage regulated power supply is connected between the terminal 14 and ground 12, the terminals 10 and 14 being connected together by means of a resistor 16. Terminal 10 is shown as a negative terminal of the unregulated power supply. The anode of a Zener diode 18, or of another breakdown device having similar properties, is connected to the junction of the resistor 16 and the load terminal 14. The cathode of the Zener diode 18 is connected to the emitter of a NPN transistor 20 whose base is connected to ground 12 and whose collector is connected to one end of each of two resistors 22 and 24. The other end of the resistor 24 is connected to a terminal 26 of a voltage source, not shown, which is positive with respect to ground 12 and which may be a battery. The other end of the resistor 22 is connected to one end of a resistor 28 whose other end is connected to the terminal 10 of the unregulated source (not shown). The junction of the two resistors 22 and 28 is connected to the base of a PNP transistor 30 whose emitter is connected to ground 12 and whose collector is connected to the anode of the Zener diode 18.

In explaining the operation of the described circuit, current flows through the resistor 16 from the load connected to the terminal 14 and into the source connected to the terminal 10. If the voltage to be applied across the Zener diode 18 is high enough, the Zener diode 18 will break down and current will flow therethrough and through the base-to-emitter path of the transistor 20. Since the voltage drop across the Zener diode 18 at breakdown is nearly independent of the current therethrough, the voltage drop appearing across the diode 18 and applied to the load connected to the terminal 14 will be nearly constant, even though the voltage of the supply changes and the current taken by the load changes. However, since the current flowing through the Zener diode 18 will, in fact, vary as the current required by the load changes, there will be a change in voltage drop across the Zener diode 18 and therefore across the load as the voltage of the supply or the current required by the load changes. Since the current that flows through the Zener diode 18 also flows through the emitter of the transistor 20, the current flowing between the collector and base of the transistor 20 will change in accordance with the change of current flowing through the Zener diode 18. This is due to the fact that most of the current flowing out of the emitter of the transistor 20 will flow into the collector thereof and therefore through the resistors 22 and 28. Due to the potentiometer arrangement comprising the three resistors 22, 24 and 28 in series, and due to the connection of the base of the transistor 30 to the junction of the resistors 22 and 28, the change in current flowing through the transistor 20 will change the current flowing out of the base of the transistor 30 whereby the conductance of the path from ground 12 through the emitter-to-collector path of the transistor 30 will vary. Since the path through the transistor 30 is in shunt with the series connection of the Zener diode 18, and the emitter-to-base path of the transistor 20, a variable shunt is provided around the Zener diode 18, which varies in such a manner as to tend to keep the current through the Zener diode 18 constant regardless of changes in supply voltage or in load current. The result is that the voltage drop across the Zener diode 18 also remains constant and independent of the changes of supply voltage or load current due to the connection of the load across the Zener diode 18 through which a substantially constant current flows at all times. This voltage is the breakdown voltage of the Zener diode 18 plus a constant voltage of about half a volt that is developed between the emitter and the base of the transistor 20.

Various modifications of the described voltage regulated power supply will occur to persons skilled in the art. For example, for a positive voltage applied to the terminal 10, and a negative voltage to the terminal 26 the connections of the Zener diode 18 are reversed and the types of transistors 20 and 30 are interchanged, the oper-

What is claimed is:
1. A voltage regulator for applying voltage regulated electrical current to a load comprising
 means for connecting a source of electrical current supply to said load,
 a circuit including a breakdown device connected across said load,
 said breakdown device exhibiting voltage thereacross which varies little with change in current therethrough, whereby the voltage applied to said load is determined by the voltage developed across said breakdown device after breakdown thereof, said voltage nevertheless varying as current flow through said breakdown device varies,
 means included in said circuit to sense the current flow through said breakdown device,
 a circuit including a variable shunt means connected across said breakdown device, and
 means included in said second named circuit and connected to said current flow sensing means to operate said variable shunt means in accordance with the variations in said current flow through said breakdown device to reduce the variations in current flow through said breakdown device, whereby variations in the voltage developed across said breakdown device and in the voltage applied to said load are also minimized.

2. The invention as claimed in claim 1 in which said breakdown device is a Zener diode.

3. The invention as claimed in claim 1 in which said breakdown device is a Zener diode and said current current sensing means is a transistor whose emitter-to-base path is connected in series with the Zener diode.

4. The invention as claimed in claim 1 in which said current breakdown device is a Zener diode and in which said current sensing means is a transistor whose emitter-to-base path is connected in series with said Zener diode and in which said variable shunting means comprises
 a transistor whose collector-to-emitter path is connected in circuit with said Zener diode.

5. A voltage regulator comprising
 a resistor,
 means for connecting a source of unregulated voltage to a load through said resistor,
 a Zener diode having one terminal connected to that terminal of said resistor connected to said load,
 a first transistor having an emitter, a collector and a base,
 said emitter of said first transistor being connected to the other terminal of said Zener diode and said base of said first transistor being connected to a point of reference potential,
 a second transistor having an emitter, a collector and a base, said collector of said second transistor being connected to said one terminal of said Zener diode and said emitter thereof being connected to said point of reference potential, and
 means for coupling said collector of said first transistor to said base of said second transistor to control the conductivity of said second transistor in accordance with the current flow through said Zener diode, whereby the current flow through said Zener diode and therefore the voltage applied to said load is kept substantially constant.

6. The invention as claimed in claim 5 in which said transistors are of opposite conductivity type and in which said second transistor is of such conductivity type that the collector-to-emitter path of said second transistor provides a shunt path around said Zener diode for current flowing therethrough.

7. A voltage regulator comprising
 a resistor,
 means for connecting a terminal of first potential of a source of unregulated voltage to a load through said resistor,
 a Zener diode having one terminal connected to that terminal of said resistor connected to said load,
 a first transistor having an emitter, a collector and a base,
 said emitter of said first transistor being connected to the other terminal of said Zener diode and said base of said first transistor being connected to a point of reference potential,
 a second transistor having an emitter, a collector and a base, said collector of said second transistor being connected to said one terminal of said Zener diode and said emitter thereof being connected to said point of reference potential,
 a plurality of resistors connected in series from said terminal of said source to a terminal of opposite potential of a second source of voltage,
 means for connecting the other terminal of said second source to said point of reference potential,
 means for connecting the collector of said first transistor to the junction of two resistors of said plurality of resistors, and
 means for connecting the base of said second transistor to a junction of said resistors other than said above-mentioned junction of resistors.

References Cited

UNITED STATES PATENTS

| | | | |
|---|---|---|---|
| 3,007,102 | 10/1961 | Kennedy | 321—16 |
| 3,202,904 | 8/1965 | Madland | 323—22 X |
| 3,315,254 | 4/1967 | Rockey | 307—285 X |

JOHN F. COUCH, Primary Examiner.

A. D. PELLINEN, Assistant Examiner.

U.S. Cl. X.R.

323—39